United States Patent
Sakurai et al.

(10) Patent No.: US 6,872,115 B2
(45) Date of Patent: Mar. 29, 2005

(54) BLADE WITH COMB TEETH COATED WITH A COMPOUND LAYER FOR FORMING RIBS AND ITS PRODUCTION METHOD

(75) Inventors: Hideaki Sakurai, Naka-gun (JP); Kunio Sugamura, Naka-gun (JP); Yoshio Kanda, Naka-gun (JP); Ryuji Uesugi, Naka-gun (JP); Yoshirou Kuromitsu, Naka-gun (JP); Young Cheul Kang, Chonan (KR); Eun Gi Heo, Chonan (KR); Young Soo Seo, Chonan (KR); Seung Jae Chung, Chonan (KR); Joon Min Kim, Chonan (KR); Hyun Sub Lee, Chonan (KR)

(73) Assignees: Mitsubishi Material Corporation, Tokyo (JP); Samsung SDI Co., Ltd., Kyonggi-do (KR)

( * ) Notice: Subject to any disclaimer, the term of this patent is extended or adjusted under 35 U.S.C. 154(b) by 176 days.

(21) Appl. No.: 10/252,361

(22) Filed: Sep. 24, 2002

(65) Prior Publication Data

US 2003/0056313 A1 Mar. 27, 2003

(30) Foreign Application Priority Data

Sep. 27, 2001 (JP) .................................. P 2001-296896

(51) Int. Cl.$^7$ ................................................. H01J 9/06
(52) U.S. Cl. ........................................... 445/66; 445/24
(58) Field of Search ................... 445/24; 313/582–586; 430/321; 345/60; 29/846, 847; 118/624, 620; 501/16, 20; 428/432

(56) References Cited

FOREIGN PATENT DOCUMENTS

| JP | H11-283497 | 10/1999 | |
| JP | 2000-299055 | * 10/2000 | ............. H01J/9/02 |
| JP | 2003297231 A | * 10/2003 | ............. H01J/9/02 |

* cited by examiner

*Primary Examiner*—Joseph Williams
(74) *Attorney, Agent, or Firm*—Rader, Fishman & Grauer PLLC (57) ABSTRACT

One object of the present invention is to provide a blade for forming ribs that is able to improve wear resistance; in order to achieve the object, the present invention provide a blade for forming ribs that forms ribs either on the surface of a substrate or via an undercoating layer on the surface of a substrate by moving a blade body in a fixed direction relative to a paste film in the state in which comb teeth formed on at least a portion of the periphery of said blade body are penetrated into said paste film formed on the surface of said substrate to plasticly deform said paste film; wherein, the surface of said comb teeth formed on said blade body that makes contact with said paste film is coated with a compound layer in which hard particles are dispersed in a metal.

24 Claims, 9 Drawing Sheets

BLADE WITH COMB TEETH COATED WITH A COMPOUND LAYER FOR FORMING RIBS AND ITS PRODUCTION METHOD

BACKGROUND OF THE INVENTION

1. Field of the Invention

The present invention relates to a blade for forming ribs and its production method for easily and accurately forming ribs (ceramic capillary ribs) in the production process of FPD (flat panel displays) such as PDP (plasma display panels) and PALC (plastic addressed liquid crystal displays).

2. Description of the Related Art

Figure 10:
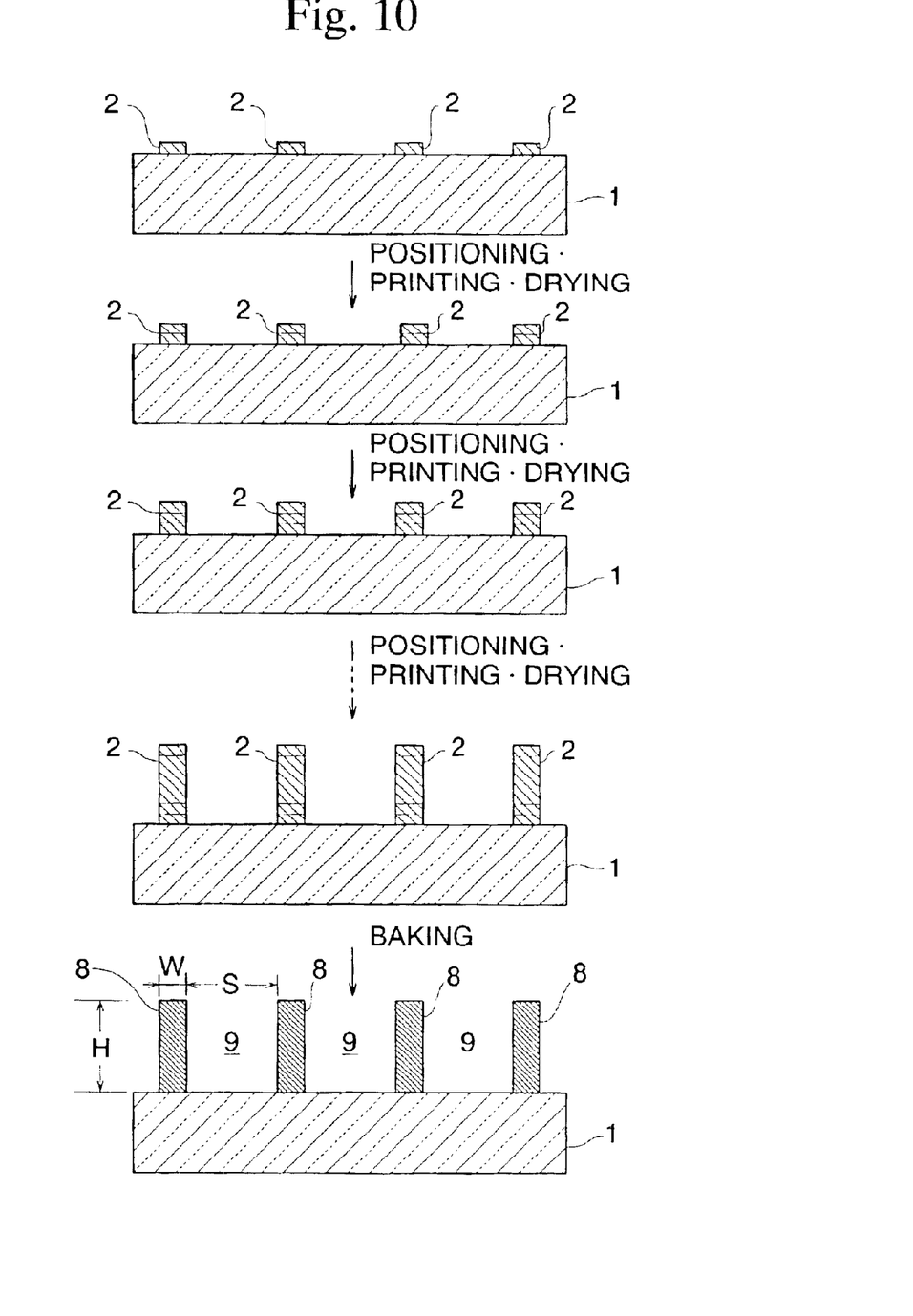
FIG. 10 is a cross-sectional view showing the sequence of steps for forming ceramic ribs of the prior art.

In the past, in a first method of forming ribs in these FDP, ribs 8 are made by positioning a rib-forming paste 2 containing glass powder on a glass substrate 1 in a prescribed pattern by a thick film printing method, coating several layers of the paste, and baking the paste after drying to form ribs 8 at prescribed intervals on substrate 1 as shown in FIG. 10. The height H of rib 8 is normally 100–300 $\mu$m, rib width W is normally about 50–100 $\mu$m, and the spread S of cell 9 between the ribs is normally about 100–300 $\mu$m.

Figure 11:
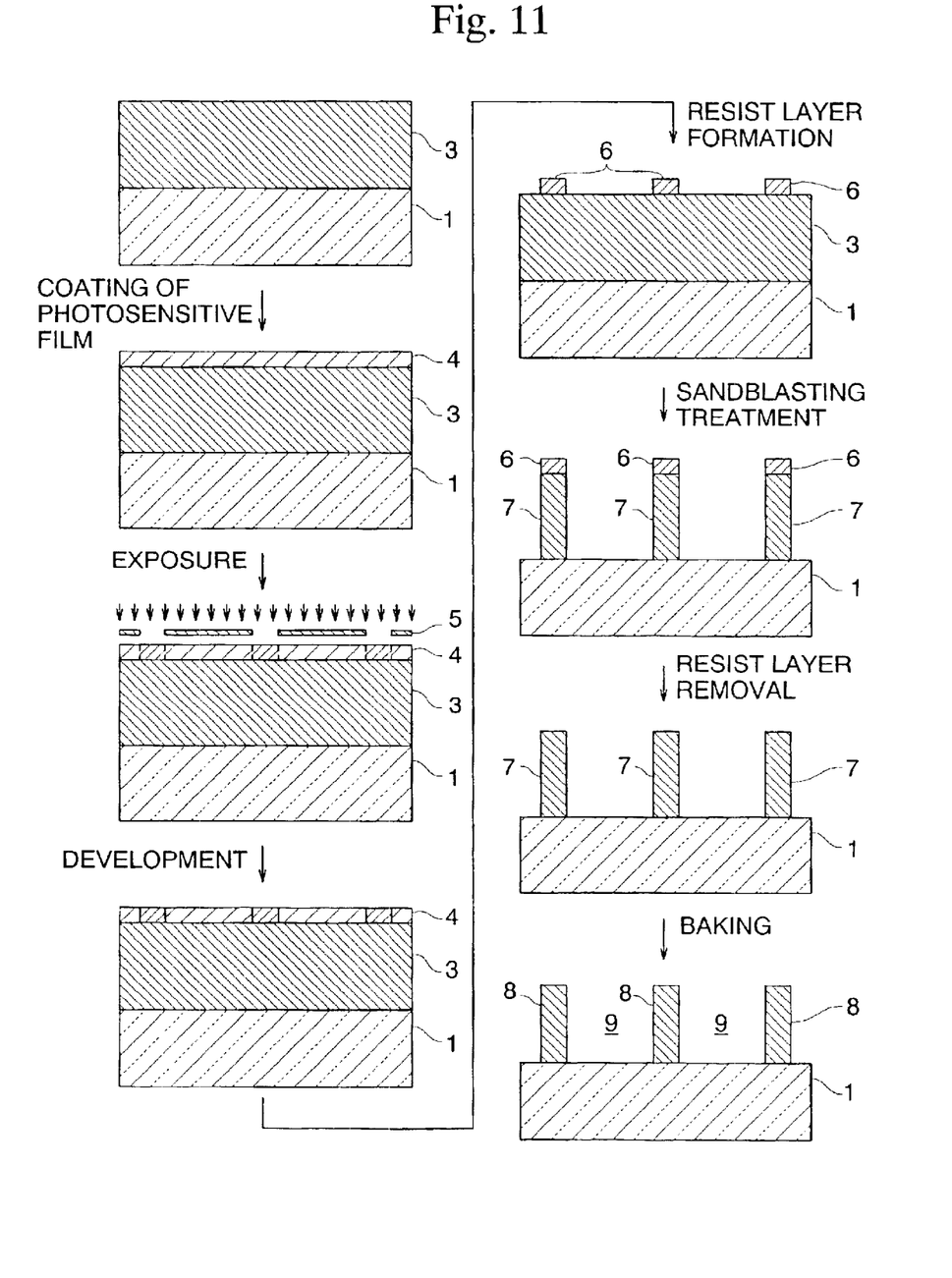
FIG. 11 is a cross-sectional view showing the sequence of steps for forming other ceramic ribs of the prior art.

In addition, the sandblasting method is known as a second method of forming ribs. In this method, a ceramic paste containing glass powder is coated onto the entire surface of a glass substrate 1 using a thick film method, and after forming pattern forming layer 3 having a height of 150–200 $\mu$m by drying or laminating ceramic green tape containing glass powder, this pattern forming layer 3 is coated with a photosensitive film 4, and this film 4 is further covered with a mask 5 followed by exposure and development to form resist layer 6 of a prescribed pattern as shown in FIG. 11. Next, after performing sandblasting treatment from above this resist layer 6 and removing the portion to serve as cell 9, the above resist layer 6 is removed using a remover and so forth to obtain the desired ribs 8.

In the above first forming method of the prior art, since rib width W is comparatively narrow at about 50–100 $\mu$m and the paste runs easily after printing, the thickness of a single coating of the thick film must be held to a low value of about 10–20 $\mu$m at completion of baking. As a result, in order to make ribs having a height H of 100–300 $\mu$m with this method, it is necessary to coat the thick film by as many as 10–20 times, and since the value of H/W, representing the rib height H after coating divided by rib width W, is large at about 1.5–4, there was the disadvantage of it being difficult to accurately form the ribs even positioning is performed adequately during thick film printing.

In addition, the above second forming method of the prior art requires the coating of a photosensitive film to form the resist layer as well as complicated steps such as exposure and development. In addition, there was also the disadvantage of requiring a large amount of material for the pattern forming layer since a large portion of the pattern forming layer is removed in sandblasting treatment.

In order to eliminate these problems, a method was proposed in which a blade having prescribed comb teeth is penetrated into a paste film formed on a substrate surface, and the blade is moved in a fixed direction relative to the paste film to plasticly deform the paste film and form ribs on the substrate surface (Japanese Unexamined Patent Application, First Publication No. 11-283497). Ribs formed with this method become ceramic ribs as a result of subsequent drying and baking, thereby making it possible to form ceramic ribs both easily and accurately, without waste and in fewer steps as compared with the thick film printing method of the prior art.

However, in the above method for forming ribs, when the blade for forming ribs is used continuously, there was the problem of the comb teeth of the blade that make contact with the paste film wearing down. Since ribs formed by a blade in which the comb teeth are worn have poor accuracy and the height of the formed ribs decreases, it was necessary to frequently replace the blade.

SUMMARY OF THE INVENTION

The object of the present invention is to provide a blade for forming ribs that is able to improve wear resistance.

Another object of the present invention is to provide a production method of a blade that lowers the frequency of blade replacement and improves the accuracy of the ribs that are formed.

Figure 2:
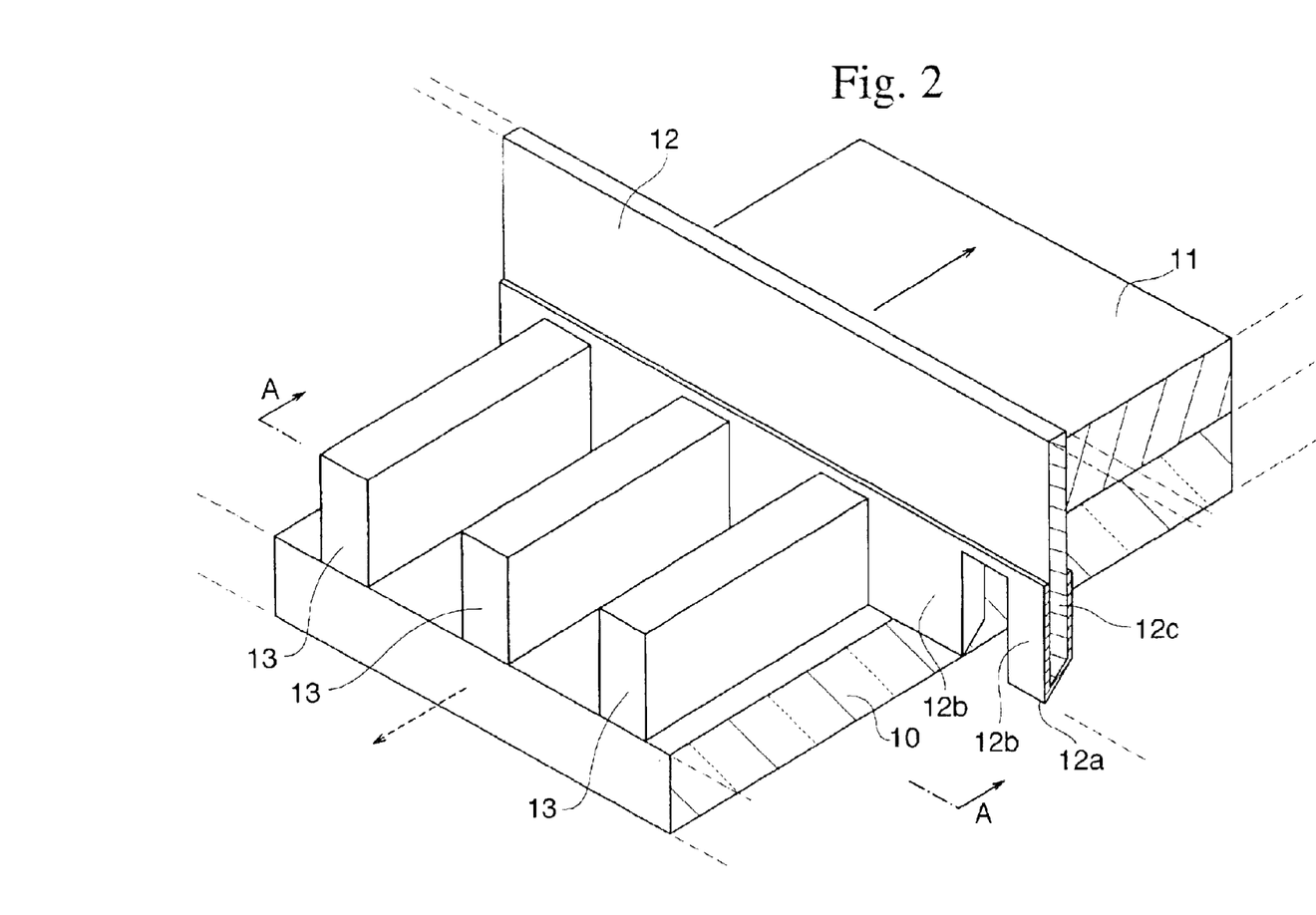
FIG. 2 is a perspective view showing the state in which ribs are formed using the blade of the present invention.

In order to achieve the object, the present invention provide, as shown in FIG. 2, a blade for forming ribs 13 either on the surface of a substrate 10 or via an undercoating layer on the surface of a substrate by moving a blade body 12 in a fixed direction relative to a paste film 11 in the state in which comb teeth 12b formed on at least a portion of the periphery of blade body 12 are penetrated into a ceramic paste film 11 formed on the surface of substrate 10 to plasticly deform paste film 11, the surface of comb teeth 12b formed on blade body 12 that makes contact with paste film 11 is coated with a compound layer 12c in which hard particles are dispersed in a metal.

According to the blade for forming ribs, since compound layer 12c in which hard particles are dispersed in a metal is coated onto the surface of comb teeth 12b that make contact with paste film 11 when ribs 13 are formed on the surface of substrate 10, this compound layer 12c inhibits wear of comb teeth 12b caused by contact with paste film 11 and the surface of substrate 10. Thus, the wear resistance of blade 12 can be improved.

In the blade, it is preferable for the material of the comb teeth to be stainless steel.

In the blade, it is also preferable for the compound layer to contain 1–50% by volume of hard particles with respect to 100% by volume of the compound layer.

In the blade, it is also preferable for the thickness of the compound layer to be 0.1–20 $\mu$m.

In the blade, it is also preferable for the metal of the compound layer to be selected from the group consisting of Ni, Ni—P, Ni—B, Ni—W, Ni—Co and Co.

In the blade, it is also preferable for the Vickers hardness H of the hard particles of compound layer to be 1,000 or more.

In the blade, it is also preferable for the hard particles of the compound layer are one type or two or more types of inorganic particles selected from diamond, amorphous diamond, silicon carbide, c-boron nitride, silicon nitride, alumina, tungsten carbide, titanium carbide, titanium nitride, tetraboron carbide, mullite, aluminum nitride and zirconia.

In the blade, it is also preferable for the average particle diameter of the hard particles to be 0.1–10 $\mu$m.

In the blade, it is also preferable for the compound layer to further contain an additive.

In the blade, it is also preferable for the additive to be a microcrystallizing agent, stress relief agent, brightening agent, dispersion stabilizer, surface potential controller or hardness enhancer.

In addition, in order to achieve the object, the present invention provides a method of producing a blade for forming ribs 13 and 23 either on the surface of a substrate 10 or via an undercoating layer 22 on the surface of substrate 10 by moving a blade body 12 in a fixed direction relative to a paste film 11 in the state in which comb teeth 12b formed on at least a portion of the periphery of blade body 12 are penetrated into ceramic paste film 11 formed on the surface of substrate 10 to plasticly deform paste film 11; comprising the step of: a step in which in which comb teeth 12b are formed on one edge of a plate-shaped blade body 12 made of ceramic or metal; and a step in which the surface of comb teeth 12b is coated with a compound layer 12c in which hard particles are dispersed in a metal.

According to the method of producing, since the blade is coated with a compound layer on its surface, the replacement frequency of the blade can be lowered and the accuracy of the ribs that are formed can be improved.

In the blade production method, it is preferable for the material of the comb teeth to be stainless steel.

In the blade production method, it is also preferable for the compound layer to contain 1–50% by volume of hard particles with respect to 100% by volume of the compound layer.

In the blade production method, it is also preferable for the thickness of the compound layer to be 0.1–20 $\mu$m.

In the blade production method, it is also preferable for the metal of compound layer to be selected from the group consisting of Ni, Ni—P, Ni—B, Ni—W, Ni—Co and Co.

In the blade production method, it is also preferable for the Vickers hardness H of the hard particles of compound layer is 1,000 or more.

In the blade production method, it is also preferable for the hard particles of compound layer to be one type or two or more types of inorganic particles selected from diamond, amorphous diamond, silicon carbide, c-boron nitride, silicon nitride, alumina, tungsten carbide, titanium carbide, titanium nitride, tetraboron carbide, mullite, aluminum nitride and zirconia.

In the blade production method, it is also preferable for the average particle diameter of the hard particles to be 0.1–10 $\mu$m.

In the blade production method, it is also preferable for the compound layer to further contain an additive.

In the blade production method, it is also preferable for the additive to be a microcrystallizing agent, stress relief agent, brightening agent, dispersion stabilizer, surface potential controller or hardness enhancer.

DETAILED DESCRIPTION OF THE PREFERRED EMBODIMENTS

The following provides an explanation of a first embodiment for carrying out the present invention based on the drawings.

Figure 4:
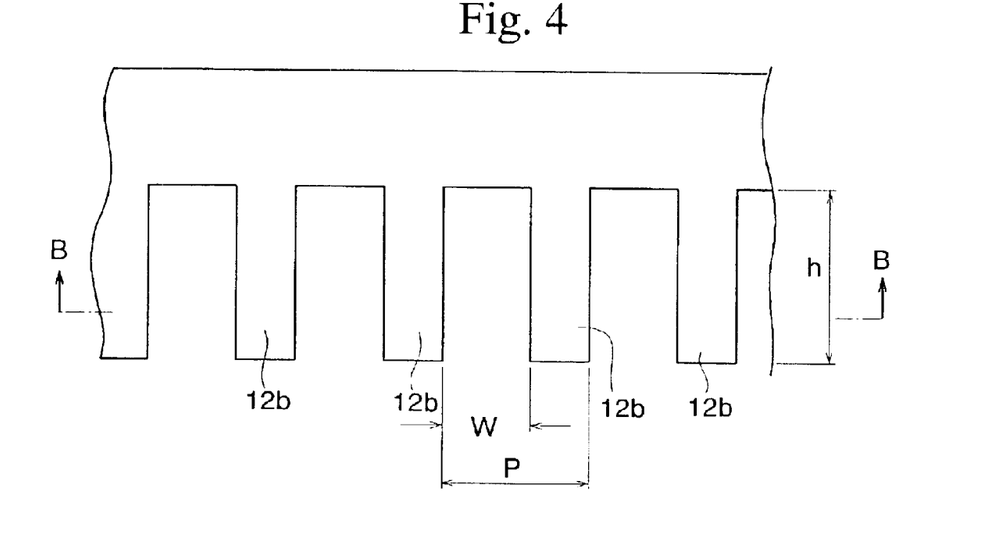
FIG. 4 is a front view of that blade.
Figure 5:
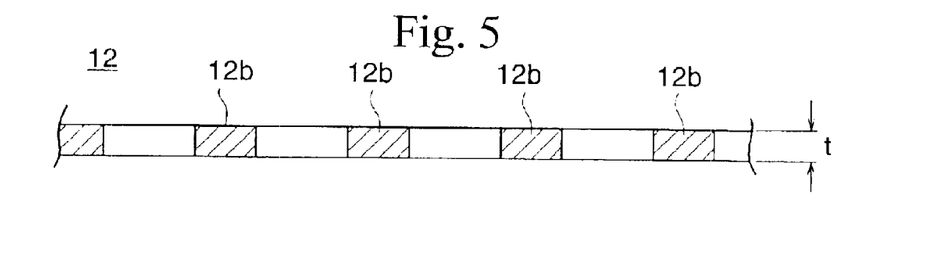
FIG. 5 is a cross-sectional view taken along line B—B of FIG. 4.

In the rib forming blade for forming ribs 13 on the surface of substrate 10, a plurality of comb teeth 12b are formed at equal intervals and in the same direction on one edge of plate-shaped blade body 12 made of ceramic or metal as shown in FIGS. 4 and 5.

Figure 1:
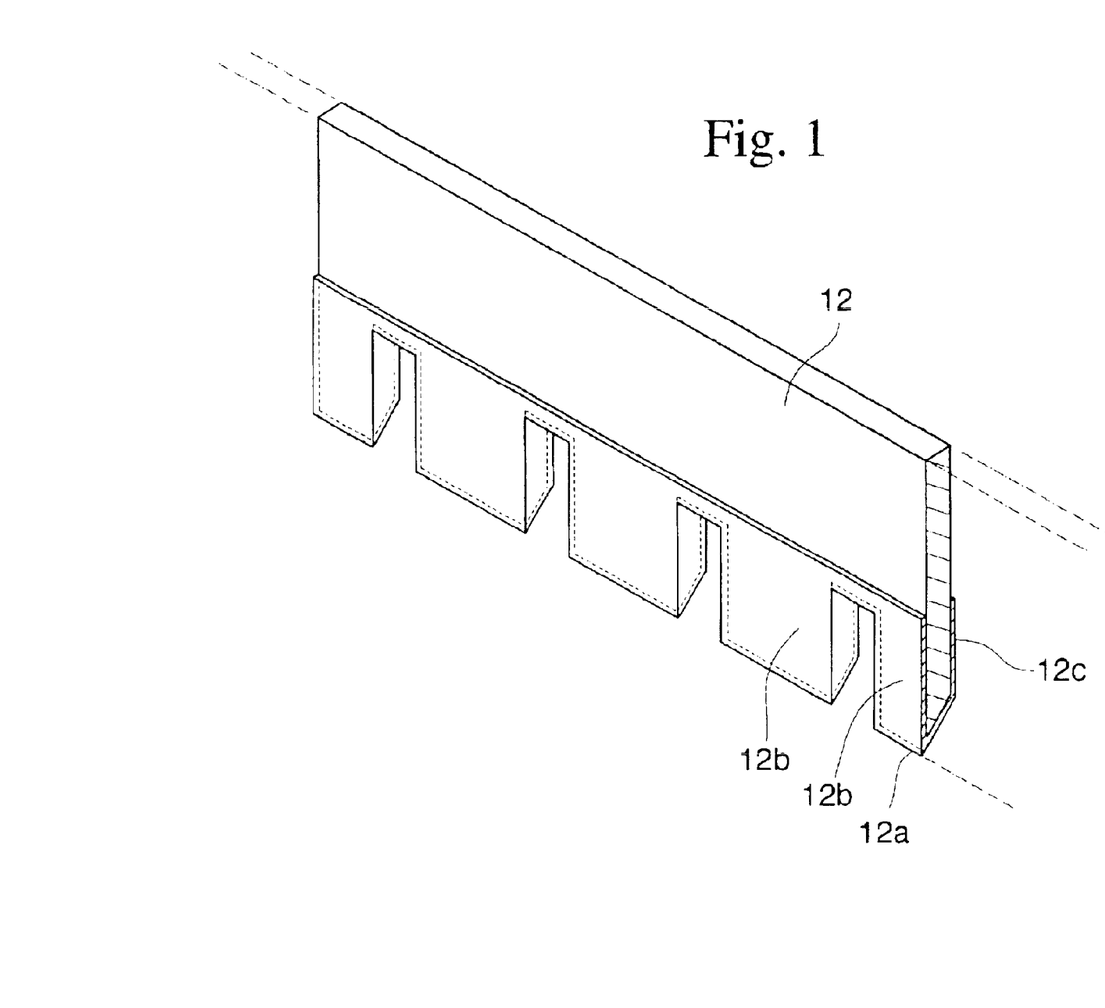
FIG. 1 is a perspective view of the blade for forming ribs of the present invention.

As shown in FIG. 1, the characteristic constitution of the blade for forming ribs of the present invention lies in the coating of the surface of comb teeth 12b formed on blade body 12 that make contact with paste film 11 with a compound layer 12c in which hard particles are dispersed in a metal. Stainless steel having superior corrosion resistance that is not react with the paste and is not dissolved in the paste is used for the material of comb teeth 12b.

The compound layer 12c that coats the surface of comb teeth 12b contains hard particles at a ratio of 1–50% by volume to 100% by volume of the compound layer. If the blending ratio of hard particles is less than the 1% by volume, the effect of improving wear resistance is small, and if the blending ratio exceeds 50% by volume, the fixing of hard particles to the film is inadequate, causing them to fall off during the course of wear. The blending ratio of hard particles is preferably 3–20% by volume.

The thickness of the coated compound layer is 0.1–20 $\mu$m. If the thickness is less than 0.1 $\mu$m, the effect of improving wear resistance is small, and if the thickness exceeds 20 $\mu$m, cracks form in the compound layer or the compound layer comes off of the blade base material during rib formation. The thickness of the coated compound layer is preferably 1–10 $\mu$m.

The metal material of compound layer 12c is selected from the group consisting of Ni, Ni—P, Ni—B, Ni—W, Ni—Co and Co. Among these, Ni, Ni—P and Ni—B are preferable from the viewpoint of material cost and characteristics.

The hard particles of compound layer 12c have a Vickers hardness of 1,000 or more. Vickers hardness HV is one kind of indentation hardness, and is typically used as one of the values for expressing the hardness of an object. The measurement method consists of using a diamond quadrangular pyramid having an angle between opposing sides of 136° as an indenter, and determining the length of the diagonal line of the square indentation that results when that indenter is pressed into the sample at a fixed load. The surface area of the indentation is then determined from the length of this diagonal line, and value obtained by dividing the load by the surface area is obtained as the Vickers hardness. This Vickers hardness is expressed as a value only without units.

In addition, the material of the hard particles is one type or two or more types of inorganic particles selected from diamond, amorphous diamond (DLC), silicon carbide (SiC), c-boron nitride (c-BN), silicon nitride ($Si_3N_4$), alumina ($Al_2O_3$), tungsten carbide (WC), titanium carbide (TiC), titanium nitride (TiN), tetraboron carbide ($B_4C$), mullite, aluminum nitride (AlN) and zirconia ($ZrO_2$). Among these, silicon carbide is preferable from the viewpoint of material cost and characteristics.

The average particle diameter of the hard particles is 0.1–10 μm. If the average particle diameter is less than 0.1 μm, the effect of improving wear resistance is small, and if the average particle diameter exceeds 10 μm, variations in the shape of the blade openings become large. The average particle diameter of the hard particles is preferably 1–5 μm.

Blade durability and accuracy of the intervals between the ribs formed using this blade are improved by additionally containing an additive in the compound layer.

Examples of additives include a microcrystallizing agent, stress relief agent, brightening agent, dispersion stabilizer, surface potential controller and hardness enhancer. More specifically, examples of microcrystallizing agents and stress relief agents include sulfur compounds such as saccharin, examples of brightening agents include butenediol, examples of hard particle dispersion stabilizers and surface potential controllers include amino compounds such as aminosilane coupling agents, and examples of hardness enhancers include phosphoric acid compounds such as hypophosphorous acid.

Examples of methods for coating the surface of comb teeth 12b with the compound layer include electrolytic plating and non-electrolytic plating. Annealing treatment may also be performed after the compound layer is formed on the blade. The hardness of the compound layer can be increased by this annealing treatment.

The following provides an explanation of an example of a method for coating the surface of the comb teeth of the blade with the compound layer using electrolytic plating.

To begin with, the surface of a stainless steel blade is degreased with base, and then cleaned with hydrochloric acid. Next, nickel strike plating is performed on the surface of the blade. Next, a compound plating bath is prepared in the ratio of 450 g/l of nickel sulfaminate, 5 g/l of nickel chloride, 30 g/l of boric acid and 50 g/l of silicon carbide powder having an average particle diameter of 3.0 μm. The blade is immersed in the prepared compound plating bath as the cathode, while a plate made of nickel metal is immersed in the compound plating bath as the anode. Moreover, a compound plated film is formed on the stainless steel blade serving as the cathode under conditions of a cathode current density of 5 $A/dm^2$, plating time of 10 min., pH of 4.0 and bath temperature of 45° C. As a result of electrolytic plating under these conditions, a compound plated film having a film thickness of 5 μm can be formed on the stainless steel blade. The amount of silicon carbide powder contained in this compound plated film is 10% by volume.

The respective gaps between comb teeth 12b are formed corresponding to the cross-sectional shape of the ribs formed by this blade 12. In addition, the shape of the gaps of comb teeth 12b is not only the case of forming a rectangular shape as shown in FIG. 4, but rather the shape of the gaps of comb teeth 12b may form a trapezoidal shape or inverted trapezoidal shape according to the application of the FPD ultimately produced. If the shape of the gaps of comb teeth 12b is made to be trapezoidal, ribs 13 can be formed that are suited for applications having wide openings, while if the shape of the gaps of comb teeth 12b is made to be inverted trapezoidal, ribs 13 can be formed in which the apices of the ribs have a wide area and are flat.

Figure 8A:
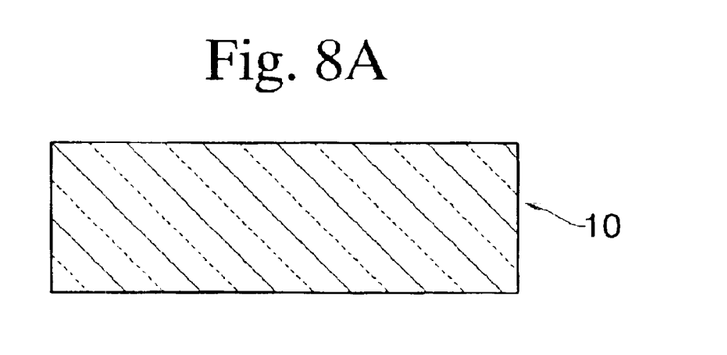
FIG. 8 is a cross-sectional view of a substrate suited for use of the blade of the present invention.
Figure 8B:
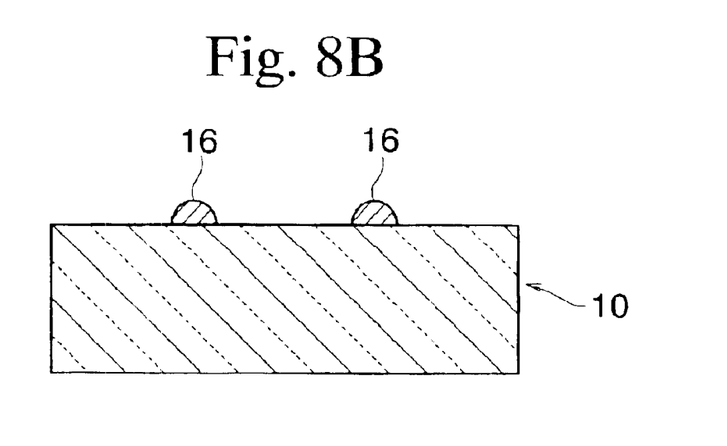
Figure 8C:
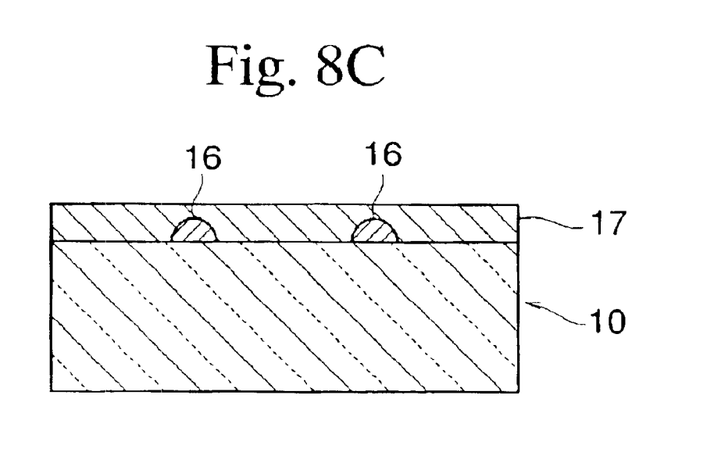

As shown in FIG. 2, in the method for forming ribs 13 on the surface of a substrate by blade 12, a paste is first coated onto substrate 10 to form ceramic paste 11 on its surface. Examples of suitable substrates in the present invention include glass substrate 10 only shown in FIG. 8A, glass substrate 10 on which electrodes 16 are formed on its surface shown in FIG. 8B, and glass substrate 10 on which an undercoating layer 17 made of ceramic and so forth is formed on the surface shown in FIG. 8C. Among these, glass substrate 10 on which undercoating layer 17 is formed on its surface is suitable for using the blade of the present invention. Coating of paste onto the surface of substrate 10 is carried out by a known means such as screen printing, dipping or doctor blade coating. Next, comb teeth 12b formed on at least a portion of the periphery of blade body 12 are penetrated into paste film 11 formed by coating a paste onto the surface of substrate 10, and edge 12a of blade 12 is brought into contact with the surface of substrate 10 on which paste film 11 has been formed. Next, in the state in which edge 12a is in contact with the surface of substrate 10, either blade 12 is moved in a fixed direction as indicated with the solid line arrow of FIG. 2 while fixing substrate 10, or substrate 10 is moved in a fixed direction as shown with the broken line arrow of FIG. 2 while fixing blade 12, to plasticly deform paste film 11. Namely, due to the above movement, the locations corresponding to comb teeth 12b of blade 12 in the paste coated onto the surface of substrate 10 are those locations that move to the gaps between comb teeth 12b or are scratched off, and only the paste located in the gaps between comb teeth 12b remains on substrate 10 to form ribs 13 on the surface of substrate 10. In the case the depth of the grooves of the comb teeth is greater than the thickness of paste film 11, paste that is scratched off when blade 12 or glass substrate 10 is moved enters the grooves, allowing the formation of ribs 13 having a height equal to or greater than the thickness of paste film 11.

Figure 3:
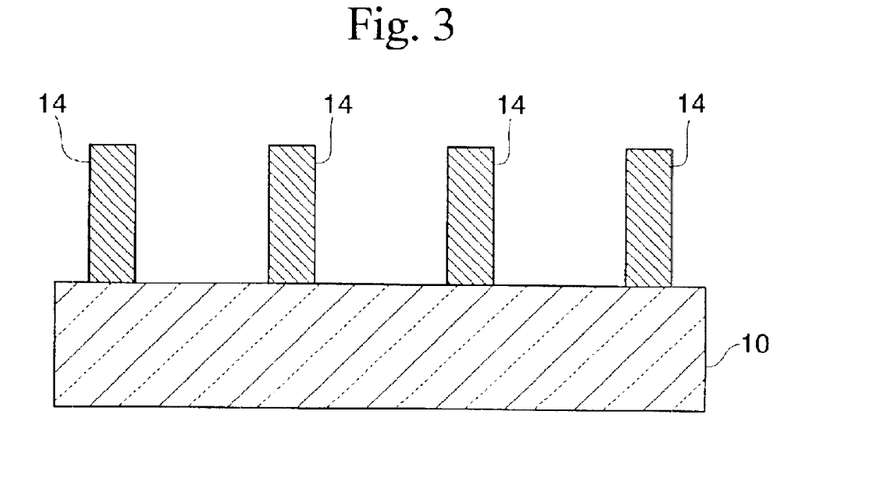
FIG. 3 is a cross-sectional view showing ceramic ribs obtained by drying, heating and baking the ribs in the cross-section taken along line A—A of FIG. 2.

Ribs 13 formed in this manner become ceramic ribs (not shown) by being subsequently dried, and by additionally heating to remove binder followed by baking, the ceramic ribs 14 shown in FIG. 3 are formed.

Figure 6:
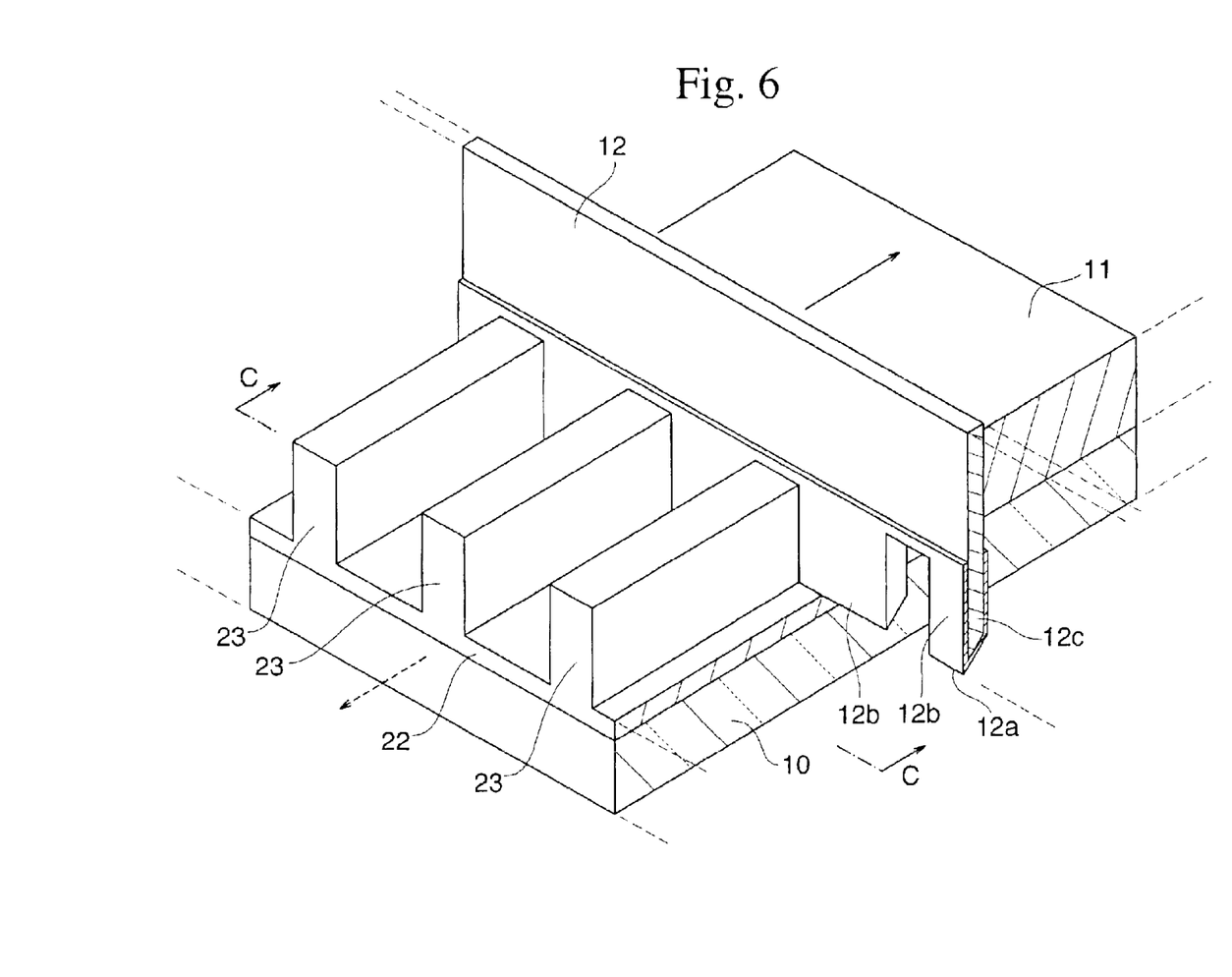
FIG. 6 is a perspective view corresponding to FIG. 2 showing the state in which ribs having an undercoating layer are formed.
Figure 7:
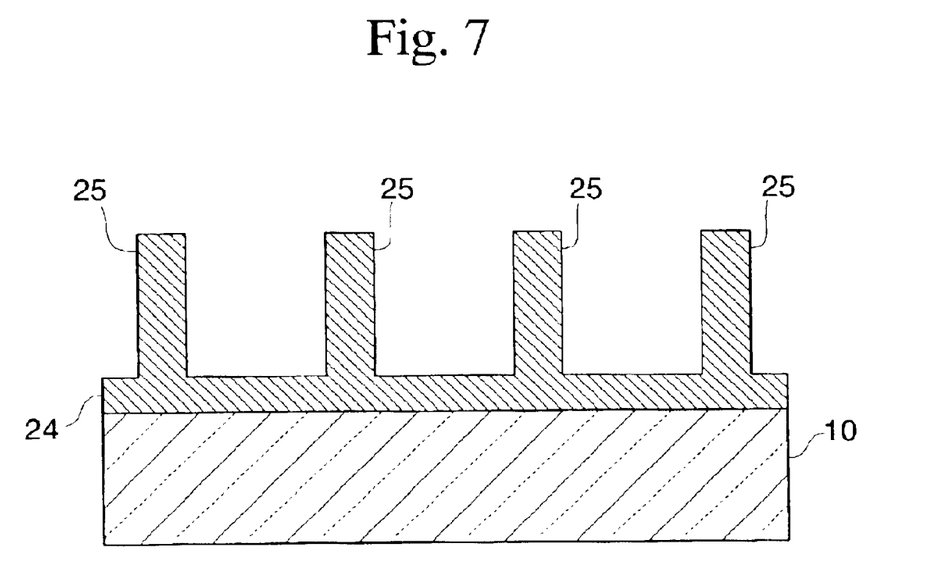
FIG. 7 is a cross-sectional view corresponding to FIG. 3 showing ceramic ribs having an insulating layer obtained by drying, heating and baking ribs having an undercoating layer in cross-section taken along line C—C of FIG. 6.

Next, the following provides an explanation of a second embodiment for carrying out the present invention based on FIGS. 6 and 7. The same reference symbols used in FIGS. 2 and 3 indicate the same constituent members in FIGS. 6 and 7. In this embodiment for carrying out the invention, the following points are different from the previously described embodiment for carrying out the invention. Namely, by penetrating comb teeth 12b formed on blade 12 into paste film 11 formed by coating a paste onto the surface of substrate 10, and moving blade 12 or substrate 10 in a fixed direction in the state in which edge 12a of blade 12 is lifted from the surface of substrate 10 at a prescribed height, undercoating layer 22 and ribs 23 on this undercoating layer 22 can be formed on the surface of substrate 10. The constitution other than that described above is similar to the first embodiment for carrying out the invention.

Namely, as shown in FIG. 6, formation of ribs 23 by blade 12 is carried out by either moving blade 12 in a fixed direction as shown with the solid line arrow while fixing substrate 10, or moving substrate 10 in a fixed direction, in the state in which edge 12a of blade 12 is lifted from the surface of substrate 10 at a prescribed height. As a result of this movement, undercoating layer 22 is formed while leaving paste on the surface of the substrate to a prescribed height from the surface of substrate 10, and the locations corresponding to comb teeth 12b of blade 12 in the paste above this undercoating layer 22 either move to the gaps of comb teeth 12b or are scratched off, and only the paste located in the gaps of comb teeth 12b remains on undercoating layer 22, while ribs 23 are formed on undercoating layer 22.

The undercoating layer 22 and ribs 23 formed in this manner are subsequently dried to form a ceramic green layer and ceramic green ribs (not shown), and as a result of heating to remove binder followed by baking, dielectric layer 24 is formed on the substrate as shown in FIG. 7, and ceramic ribs 25 are formed on this dielectric layer 24.

EXAMPLES

The following provides a detailed explanation of Examples of the present invention along with the Examples and the Comparative Examples.

Example 1

A soda lime-based glass substrate 10 was prepared having a diagonal dimension of 42 inches and thickness of 3 mm. A ceramic paste was coated onto this glass substrate 10 followed by baking to form a ceramic undercoating layer having a thickness of 10 μm on the glass substrate. As shown in FIG. 2, a paste was coated onto glass substrate 10 having an undercoating layer on its surface at a thickness of 350 μm by screen printing to form paste film 11.

On the other hand, a blade 12 formed from stainless steel was prepared in which the pitch of comb teeth 12b was 360 μm, the gap w between comb teeth 12b was 180 μm, the depth was 350 μm, the thickness was 0.1 mm and the edge angle was 75 degrees (FIGS. 4 and 5). The surface of comb teeth 12b of this blade 12 was coated with a compound layer in which hard particles in the form of silicon carbide particles were dispersed in nickel metal (FIG. 1). The composition of this compound layer consisted of 10% by volume of silicon carbide to 100% by volume of the compound layer. Comb teeth 12b of this blade 12 were then penetrated into paste film 11 at a printing pressure of 18 MPa, and blade 12 was moved at the rate of 10 mm/sec in the direction indicated with the solid line arrow of FIG. 2 in the state in which its edge 12a was in contact with glass substrate 10 to plastically deform paste film 11 and form ribs 13 on substrate 10.

Comparative Example 1

With the exception of not coating the surface of comb teeth 12 of blade 12 with compound layer 12c, ribs 13 were formed on substrate 10 in the same manner as Example 1.

Tests and Evaluation

The steps of forming ribs 13 on substrate 10 of Example 1 and Comparative Example 1 were respectively repeated a plurality of times, and the depth of the gap between comb teeth 12b of blade 12 after forming ribs 13 was measured.

Figure 9:
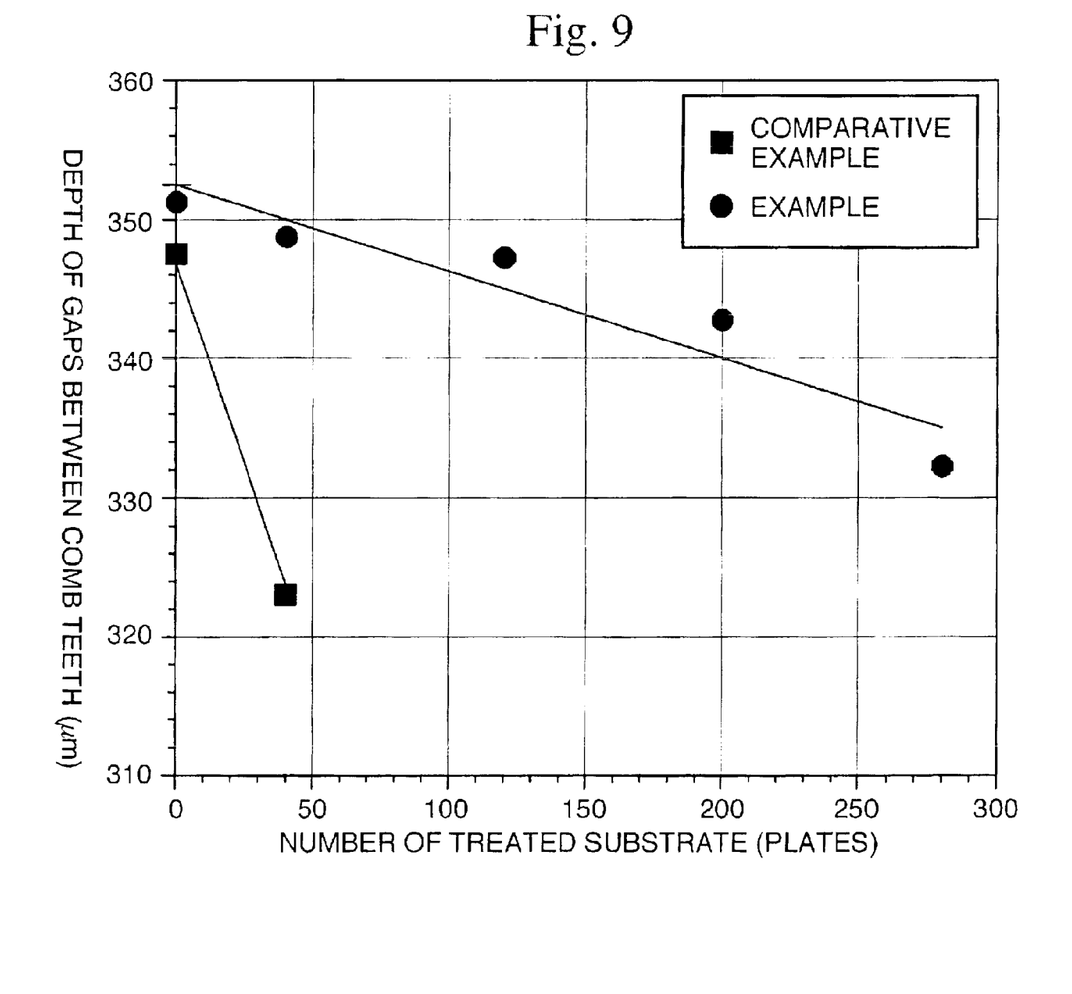
FIG. 9 is a drawing showing the relationship between the height h of the gaps between comb teeth and the number of treated substrates of Example 1 and Comparative Example 1.

The relationship between the depth h of the gaps between comb teeth 12b of blade 12 and the number substrates treated on which ribs 13 were formed is shown in FIG. 9 for the results of Example 1 in comparison with the results of Comparative Example 1.

As is clear from FIG. 9, when ribs 13 were formed on substrate 10 using blade 12 in which the surface of comb teeth 12b was not coated with compound layer 12c in Comparative Example 1, the depth h of the gaps between comb teeth 12b of blade 12 decreased rapidly before the number of treated substrates reached 50 plates, thus indicating that comb teeth 12b had become worn down by paste film 11. In contrast, when ribs 13 were formed on substrate 10 using blade 12 in which the surface of comb teeth 12b was coated with the compound layer 12c in Example 1, the depth h of the gaps between comb teeth 12b did not decrease rapidly even after forming ribs on more than 250 plates, thus indicating that the wear resistance of the blade improves significantly.

What is claimed is:

1. A blade for forming ribs that forms ribs either on the surface of a substrate or via an undercoating layer on the surface of a substrate by moving a blade body in a fixed direction relative to a paste film in the state in which comb teeth formed on at least a portion of the periphery of said blade body are penetrated into said paste film formed on the surface of said substrate to plasticly deform said paste film; wherein, the surface of said comb teeth formed on said blade body that makes contact with said paste film is coated with a compound layer in which hard particles are dispersed in a metal.

2. A blade according to claim 1, wherein said comb teeth are fabricated from stainless steel.

3. A blade according to claim 1, wherein said compound layer contains 1–50% by volume of said hard particles with respect to 100% by volume of said compound layer.

4. A blade according to claim 1, wherein the thickness of said compound layer is 0.1–20 μm.

5. A blade according to claim 1, wherein the metal of said compound layer is selected from the group consisting of Ni, Ni—P, Ni—B, Ni—W, Ni—Co and Co.

6. A blade according claim 1, wherein the Vickers hardness H of said hard particles of said compound layer is 1,000 or more.

7. A blade according claim 1, wherein said hard particles of said compound layer are one type or two or more types of inorganic particles selected from diamond, amorphous diamond, silicon carbide, c-boron nitride, silicon nitride, alumina, tungsten carbide, titanium carbide, titanium nitride, tetraboron carbide, mullite, aluminum nitride and zirconia.

8. A blade according to claim 7, wherein the average particle diameter of said hard particles is 0.1–10 μm.

9. A blade according to claim 1, wherein said compound layer further contains additive.

10. A blade according to claim 9, wherein said additive is a microcrystallizing agent, stress relief agent, brightening agent, dispersion stabilizer, surface potential controller or hardness enhancer.

11. A method of producing a blade for forming ribs that forms ribs either on the surface of a substrate or via an undercoating layer on the surface of a substrate by moving a blade body in a fixed direction relative to a paste film in the state in which comb teeth formed on at least a portion of the periphery of said blade body are penetrated into said paste film formed on the surface of said substrate to plasticly deform said paste film; comprising:

a step in which said comb teeth are formed on one edge of a plate-shaped blade body made of ceramic or metal, and a step in which the surface of said comb teeth is coated with a compound layer in which hard particles are dispersed in a metal.

12. A blade production method according to claim 11, wherein said comb teeth are fabricated from stainless steel.

13. A blade production method according to claim 11, wherein said compound layer contains 1–50% by volume of said hard particles with respect to 100% by volume of said compound layer.

14. A blade production method according to claim 11, wherein the thickness of said compound layer is 0.1–20 µm.

15. A blade production method according to claim 11, wherein said metal of said compound layer is selected from the group consisting of Ni, Ni—P, Ni—B, Ni—W, Ni—Co and Co.

16. A blade production method according to claim 11, wherein the Vickers hardness H of said hard particles of said compound layer is 1,000 or more.

17. A blade production method according to claim 11, wherein said hard particles of said compound layer are one type or two or more types of inorganic particles selected from diamond, amorphous diamond, silicon carbide, c-boron nitride, silicon nitride, alumina, tungsten carbide, titanium carbide, titanium nitride, tetraboron carbide, mullite, aluminum nitride and zirconia.

18. A blade production method according to claim 17, wherein the average particle diameter of said hard particles is 0.1–10 µm.

19. A blade production method according to claim 11, wherein said compound layer further contains additive.

20. A blade production method according to claim 19, wherein said additive is a microcrystallizing agent, stress relief agent, brightening agent, dispersion stabilizer, surface potential controller or hardness enhancer.

21. A blade, comprising:
a blade body having a plurality of comb teeth formed on at least a portion of a periphery of said blade body, each one of the comb teeth defining a surface having a compound layer formed thereon, the compound layer fabricated from metal having hard particles dispersed therein.

22. A blade according to claim 21, wherein the compound layer is formed at least on an entirety of the surface of each one of the comb teeth.

23. A method of producing a blade for forming ribs that forms ribs either on the surface of a substrate or via an undercoating layer on the surface of a substrate by moving a blade body in a fixed direction relative to a paste film in the state in which comb teeth formed on at least a portion of the periphery of said blade body are penetrated into said paste film formed on the surface of said substrate to plastically deform said paste film; comprising the steps of:
forming said comb teeth on one edge of a plate-shaped blade body made of ceramic or metal, and
coating a surface of each one of said comb teeth with a compound layer fabricated from metal with hard particles dispersed therein.

24. A method according to claim 23, wherein the compound layer is formed on at least an entirety of the surface of each one of the comb teeth.

* * * * *